(12) United States Patent
Cheng et al.

(10) Patent No.: US 11,070,954 B2
(45) Date of Patent: Jul. 20, 2021

(54) DISTRIBUTED QOS CONTROL FOR MULTICAST

(71) Applicant: QUALCOMM Incorporated, San Diego, CA (US)

(72) Inventors: Hong Cheng, Bridgewater, NJ (US); Sudhir Kumar Baghel, Hillsborough, NJ (US); Kapil Gulati, Hillsborough, NJ (US); Junyi Li, Chester, NJ (US); Zhibin Wu, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/544,550

(22) Filed: Aug. 19, 2019

(65) Prior Publication Data

US 2020/0100070 A1 Mar. 26, 2020

Related U.S. Application Data

(60) Provisional application No. 62/734,958, filed on Sep. 21, 2018.

(51) Int. Cl.
| | |
|---|---|
| *H04L 1/00* | (2006.01) |
| *H04W 4/08* | (2009.01) |
| *H04W 24/08* | (2009.01) |
| *H04W 28/16* | (2009.01) |
| *H04W 72/08* | (2009.01) |
| *H04W 4/40* | (2018.01) |

(52) U.S. Cl.
CPC ............ *H04W 4/08* (2013.01); *H04W 24/08* (2013.01); *H04W 28/16* (2013.01); *H04W 72/085* (2013.01); *H04W 4/40* (2018.02)

(58) Field of Classification Search
CPC ....... H04W 4/08; H04W 24/08; H04W 28/16; H04W 72/085; H04W 4/40
See application file for complete search history.

(56) References Cited

U.S. PATENT DOCUMENTS

| | | | |
|---|---|---|---|
| 2017/0013497 A1* | 1/2017 | Lee | .................. H04W 28/0268 |
| 2018/0234524 A1* | 8/2018 | Cheng | ................. H04L 41/0803 |
| 2018/0255499 A1* | 9/2018 | Loehr | .................. H04B 7/2606 |

(Continued)

FOREIGN PATENT DOCUMENTS

| | | |
|---|---|---|
| EP | 3273634 A1 | 1/2018 |
| WO | 2017220158 A1 | 12/2017 |

OTHER PUBLICATIONS

International Search Report and Written Opinion—PCT/US2019/047292—ISA/EPO—dated Nov. 14, 2019.

*Primary Examiner* — Abdelnabi O Musa
(74) *Attorney, Agent, or Firm* — Procopio, Cory, Hargreaves & Savitch LLP

(57) ABSTRACT

The present disclosure relates to methods and devices for group communication which may include a first UE and a set of UEs. In one aspect, the first UE may receive from each UE of the set of UEs a PDU including a header that includes a QoS level for the UE. The first UE can also determine a supported QoS level for the first UE. In another aspect, the first UE can set a transmission QoS level for the first UE to be a lowest QoS level of the determined supported QoS level and the QoS level from each UE of the set of UEs. In a further aspect, the first UE can transmit by multicast to the set of UEs a PDU based on the set transmission QoS level.

28 Claims, 12 Drawing Sheets

(56) References Cited

U.S. PATENT DOCUMENTS

| | | | |
|---|---|---|---|
| 2018/0324631 A1* | 11/2018 | Jheng | H04W 36/0022 |
| 2019/0150023 A1* | 5/2019 | Cho | H04W 28/02 |
| | | | 370/235 |
| 2020/0100156 A1* | 3/2020 | Liu | H04W 76/22 |
| 2020/0213894 A1* | 7/2020 | Agiwal | H04W 76/12 |

* cited by examiner

DISTRIBUTED QOS CONTROL FOR MULTICAST

CROSS REFERENCE TO RELATED APPLICATION(S)

This application claims the benefit of U.S. Provisional Application Ser. No. 62/734,958, entitled "DISTRIBUTED QoS CONTROL FOR MULTICAST" and filed on Sep. 21, 2018, which is expressly incorporated by reference herein in its entirety.

TECHNICAL FIELD

The present disclosure relates generally to communication systems, and more particularly, to methods and apparatus related to a group of devices in a wireless communication system including, e.g., a vehicular communication network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Group communication between devices or vehicles can include different types of data that is transmitted and/or received by the devices or vehicles. During transmission and/or reception, various signals and information can be sent over one or more resources. Presently, there exists a need to provide new and improved information for group communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first user equipment (UE), e.g., a vehicle in a vehicle-to-everything (V2X) communication network. In some aspects, the first UE may be configured to receive from each UE of a set of UEs a packet data unit (PDU) including a header that includes a quality of service (QoS) level for the UE. The first UE may also determine a supported QoS level for the first UE. In other aspects, the first UE may set a transmission QoS level for the first UE to be a lowest QoS level of the determined supported QoS level and the received QoS levels associated with each UE of the set of UEs. The first UE can also transmit by multicast to the set of UEs a PDU based on the set transmission QoS level.

In another aspect of the disclosure, a method, a computer-readable medium, and an apparatus are provided. The apparatus may be a first UE, e.g., a vehicle in a V2X communication network. In some aspects, the first UE may be configured to determine a supported QoS level for the first UE. The first UE can also transmit a PDU transmission including a header that includes the supported QoS level for the first UE. The first UE can also receive by multicast a received PDU based on a transmission QoS level. In some aspects, the transmission QoS level in the received PDU can be based on the supported QoS level in the transmitted PDU transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
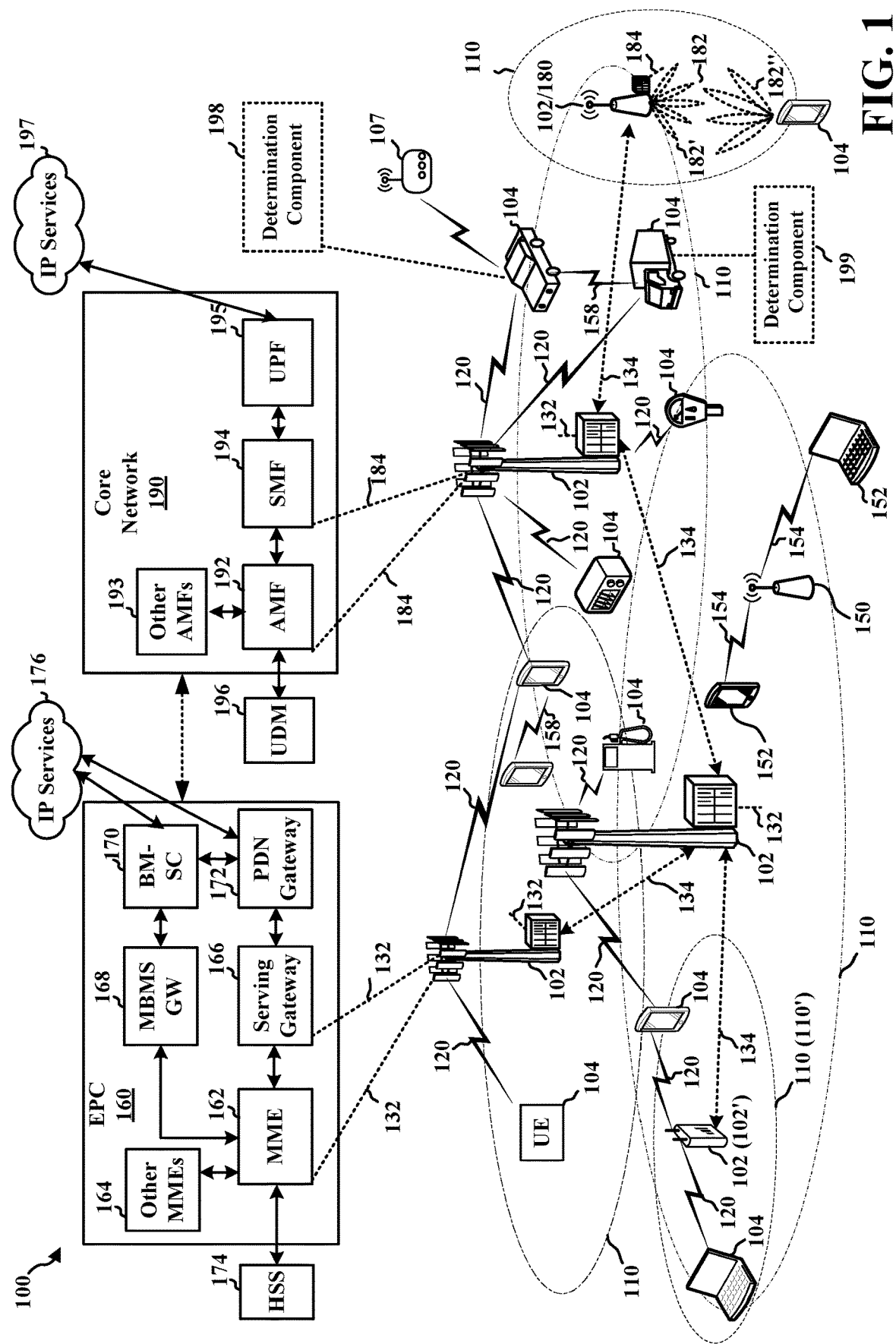
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-everything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, the UE 104 may comprise a determination component 198 configured to receive from each UE of a set of UEs a packet data unit (PDU) including a header that includes a quality of service (QoS) level for the UE. Determination component 198 can also be configured to determine a supported QoS level for the first UE. Additionally, determination component 198 can be configured to set a transmission QoS level for the first UE to be a lowest QoS level of the determined supported QoS level and the received QoS levels associated with each UE of the set of UEs. Determination component 198 can also be configured to transmit by multicast to the set of UEs a PDU based on the set transmission QoS level.

Additionally, UE 104 may comprise a determination component 199 configured to determine a supported QoS level for the first UE. Determination component 199 can also be configured to transmit a PDU including a header that includes the supported QoS level for the first UE. Further, determination component 199 can be configured to receive by multicast a PDU based on a transmission QoS level.

Figure 2:
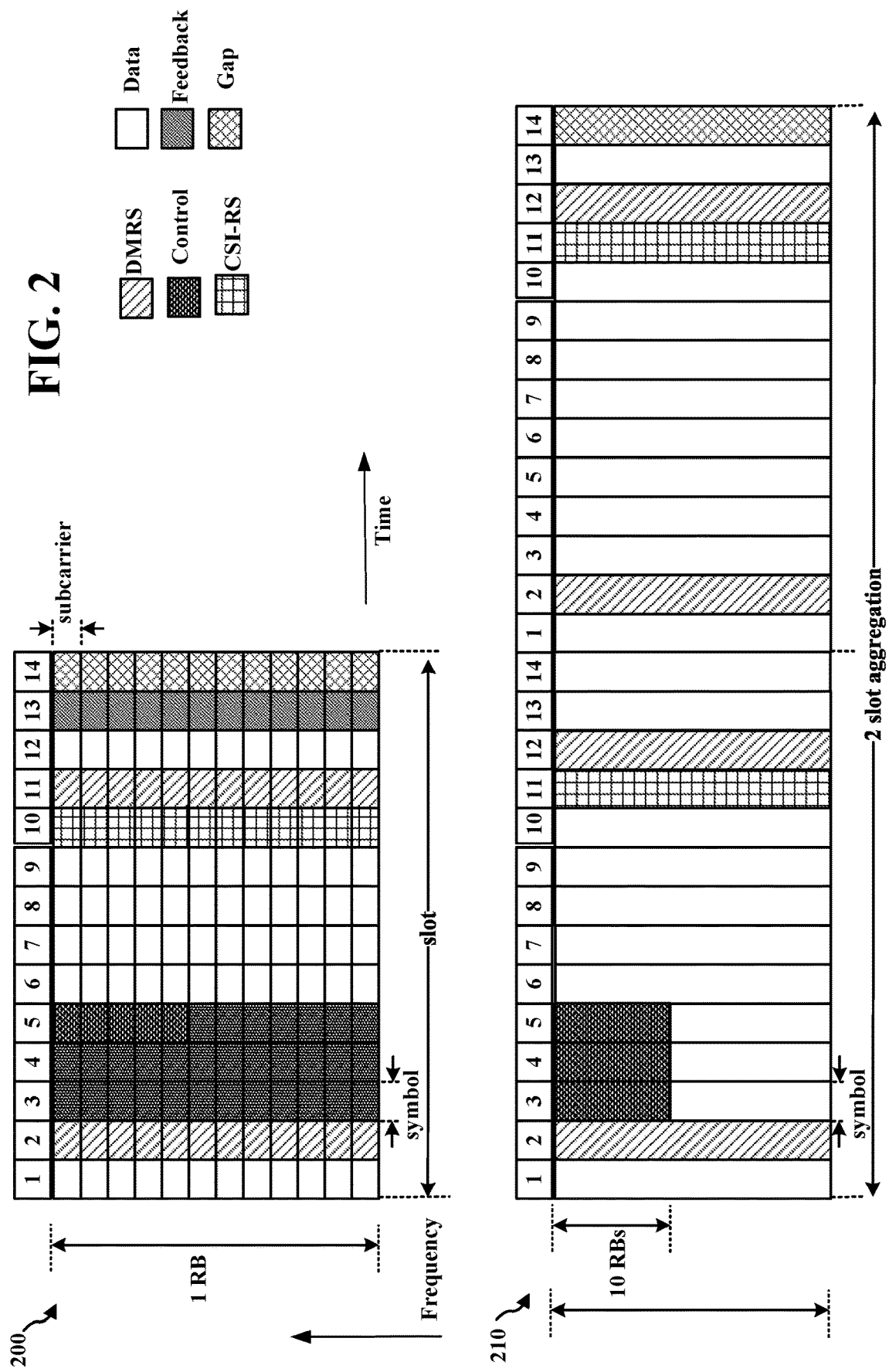
FIG. 2 illustrates example aspects of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
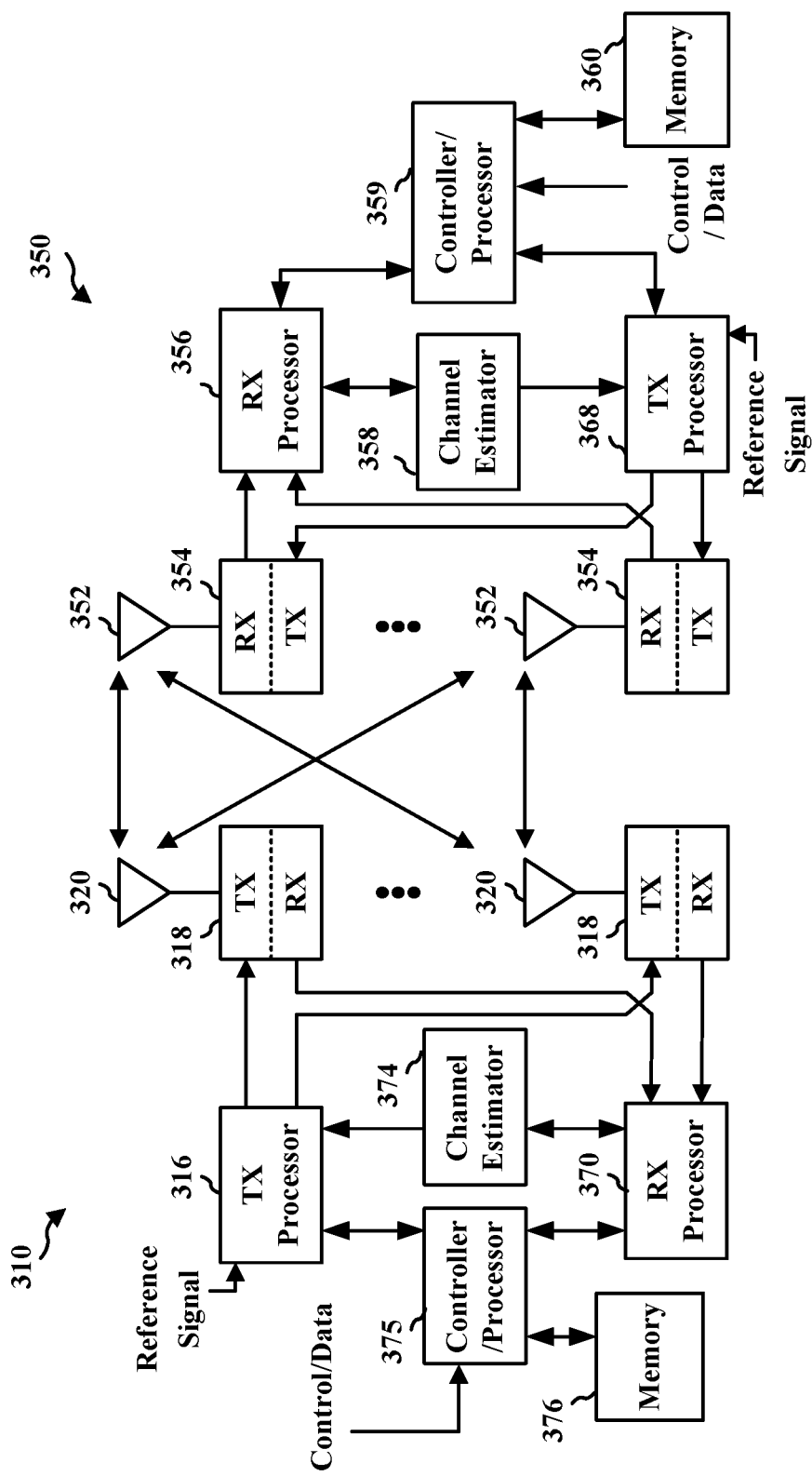
FIG. 3 is a diagram illustrating an example of a base station and user equipment (UE) in an access network.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 of FIG. 1.

At least one of the TX processor 368, the RX processor 356, or the controller/processor 359 of device 350 or the TX 316, the RX processor 370, or the controller/processor 375 may be configured to perform aspects described in connection with 199 of FIG. 1.

In communication directly between UEs, such as V2X communication or enhanced V2X (eV2X) communication, some services may need to support communication within a group of UEs, e.g., vehicles or roadside units. For instance, services may need to support communication between the UEs directly without dealing with a network, e.g., in a group or platooning application amongst vehicles. Additionally, there may be a QoS requirement for how messages are transmitted and/or received within the group, such as for communication between the group members. Group management or formation may be handled at an application layer. Group management may be performed using European Telecommunications Standards Institute (ETSI) intelligent transport systems (ITS) (ETSI-ITS) or Society of Automobile Engineers (SAE) defined messages. A device identifier of the group information can be handled at application layer because the lower layers may not be aware of the device identifier, e.g., the temporary station identifiers used at the application layer.

However, QoS handling can occur at lower layers, e.g., either the V2X layer or access stratum (AS) layer. For upper layer transmission, it may be translated to the lower layer configuration or parameters, such as to deliver the QoS requirements of the upper layer. Further, QoS support may be needed as multicast or group communication may need to support higher data rates or reliabilities than broadcast communication. QoS support may be based on eV2X service level key performance indicators (KPIs) of different use cases, e.g., platooning or corporative maneuvers. In some aspects, multicast can be sent to a group, such that multicast can be referred to as groupcast. A groupcast transmission may comprise a multicast transmission to a group of UEs.

In some aspects, the group management at upper layer may not allow QoS configuration for a group of UEs. For instance, the V2X layer or AS layer may not have visibility to the message contents of the application layer (e.g., station identifiers). In these instances, a UE may not know which message is sent to/from which UE, or to which group a UE belongs. Further, the application layer messaging format or contents may not be understandable by lower layer, as they are designed to be agnostic to the access technology. In some aspects, the UE may be unaware of some message details because the application layer may encrypt a message sent across the V2X communication. As such, this may not be directly linked with a first identifier.

Some aspects of the present disclosure may include determining a group QoS level amongst the UEs in the group. In these aspects, the QoS level may be maintained within the group, so the group members can know what the other members are capable of supporting. For instance, aspects of the present disclosure may use a reflective configuration approach to negotiate the group QoS level. In some aspects, a group QoS level may be negotiated for multicast based on indications from all members in the service data adaptation protocol (SDAP) header of the data packet or message. Accordingly, in some aspects of the present disclosure, the SDAP header may indicate the QoS level.

As indicated above, QoS levels can be modified based on the traffic dynamically. For example, the QoS level may be changed based on the traffic, load conditions, or radio conditions between the group members. The QoS levels may include multiple parameters, and AS layer operation controls, e.g., the modulation and coding scheme, may be derived from the QoS level. Further, the QoS level may be a 5G QoS identifier (5QI), e.g., a scalar value. In some aspects, the QoS level can be related to the delay, reliability, or range requirements for particular packets or messages. For example, if the range or reliability requirements are high, then a lower modulation and coding scheme may be selected.

Aspects of the present disclosure may include linking upper layer group management and the lower layer QoS handling. For instance, a reflective configuration approach may be used to configure group QoS, where a UE can derive the QoS level from received traffic and use the information to modify the outgoing traffic. In some aspects, a UE can bootstrap the process and determine the QoS for the first packet for a group. The UE can be configured with a default QoS level based on the service ID (provider service identifier (PSID) or PSID defined by SAE or intelligent transport system (ITS) application identifier (AID) defined by ETSI-ITS (PSID/ITS-AID)), that determines the bootstrapping (e.g., first packet) QoS level to use. The UE can check the service ID, and use the default QoS level for the first packet to the group. The QoS level can be further updated based on a mechanism. Additionally, the SDAP layer may be expected to be utilized for the per flow QoS model introduced for V2X, e.g., including broadcast, groupcast, and unicast. Further, the SDAP header may be added to the packet when the QoS handling is being reviewed.

Various features and aspects are described that are related to communicating in a group, e.g., by an individual UE or a group of UEs for a platooning group in a wireless communication system, e.g., including vehicular systems such as V2X networks. In accordance with the methods and features described herein, a UEs within the group can monitor and negotiate the QoS level for the group for multicast. Individual UEs can monitor QoS level based on indications from all group members. The QoS level can be modified dynamically based on the traffic and corresponding indications from group members. In order to dynamically modify the QoS level, a window based mechanism may be used to adjust the QoS level.

In some aspects of the present disclosure, a window-based timing mechanism may be used to help adjust the QoS level. This window-based timing mechanism may use different time periods to adjust to different QoS levels. For example, a longer timing window, e.g., two seconds, may be used for UEs to upgrade to a higher observed QoS level. Also, a shorter timing window, e.g., one second, may be used for UEs to downgrade to a lower observed QoS level. The QoS level of the group can be increased, decreased, or be maintained. During the timing window, a UE can observe and monitor the acceptable QoS levels for all other UEs within the group. As such, within the window period, each group member can indicate the QoS level that it can support, e.g., based on the observed radio condition. If all group members can support a higher QoS level, then the UE or group may decide to increase QoS levels. However, if any UE in the group is unable to support a higher QoS level, then the QoS level may be adjusted to account for the lower QoS capability of that UE. In these instances, the UE with the lowest QoS capability may determine the QoS level for the entire group. In some aspects, group transmissions may be more efficient if the QoS level is increased because a higher modulation scheme may be used.

Individual UEs may observe the group QoS level based on a number of inputs. For example, a UE may observe the group QoS level based on other UEs' indicated QoS level in the SDAP header. In this manner, the UE may obtain feedback from other UEs. In other aspects, a UE may observe the group QoS level based on the UE's physical layer (PHY) or MAC layer measurement. This type of measurement can also be used to determine the QoS level to place in the SDAP header, e.g., as feedback to other UEs. By doing so, each UE in the group can be synced to the appropriate QoS level.

In some aspects, the indicated QoS level in the SDAP header may be different than the QoS level that is actually used. For instance, a UE may indicate that it can support a higher QoS level, while actually using another QoS level. As such, the indicated QoS level, and the QoS level used to transmit a message or data packet, may not be identical. For example, if one UE can support a high QoS level, and the other UEs in the group support a lower QoS level, then a data packet or message can be communicated using the lower QoS level. As all the UE members in the group can receive the message or data packet, they may be able to support the QoS level of the group. Additionally, the QoS levels of the group may be indicated in a number of different manners, such as with an integer value. In some aspects, the QoS level can be indicated as a value of 1 to 8. In other aspects, the QoS level may be a higher integer value, e.g., up to 255.

Figure 4:
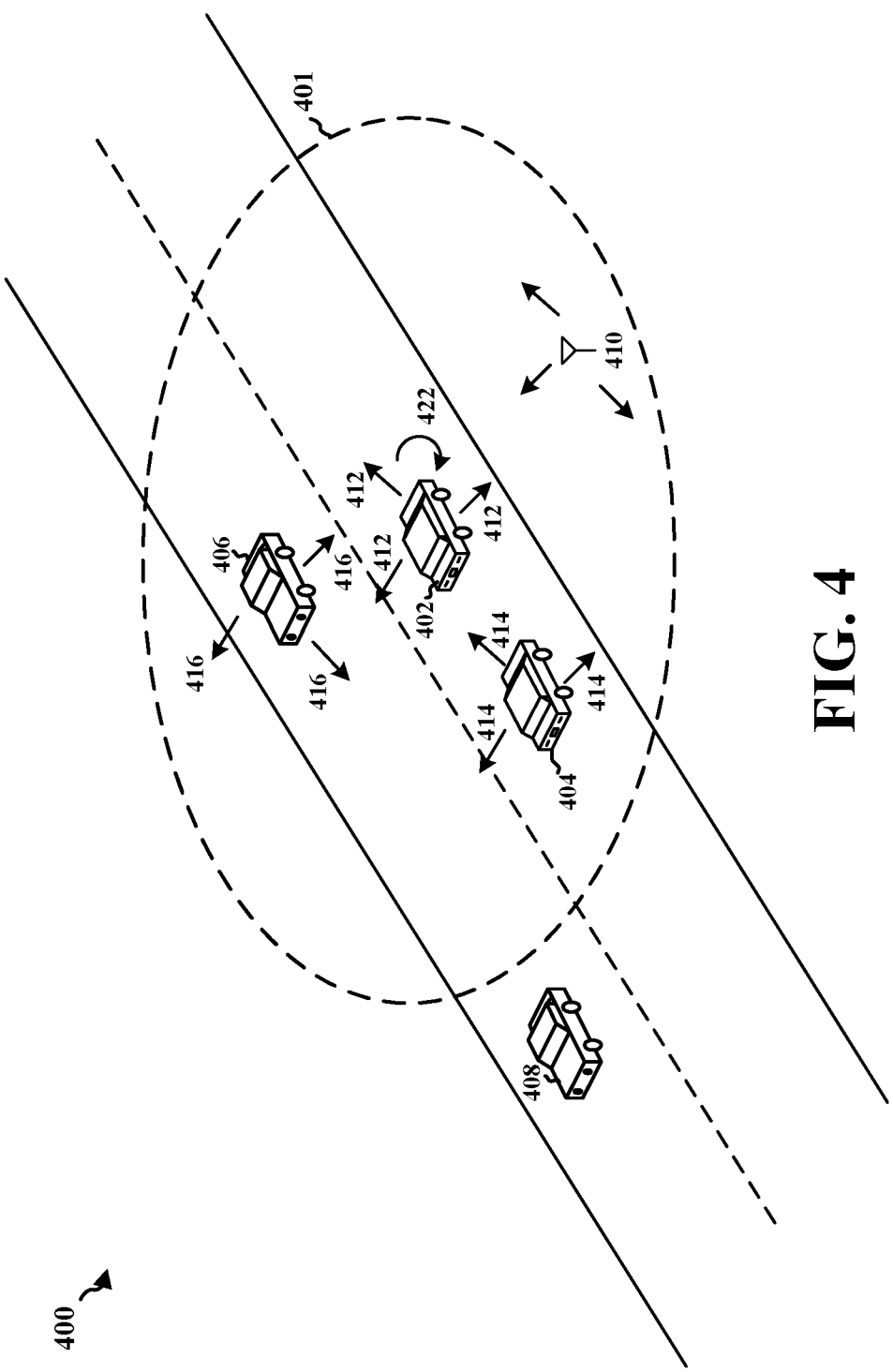
FIG. 4 illustrates an example of communication between UEs in a group.

FIG. 4 is a drawing 400 illustrating an example of group communications between UEs. In the illustrated example, a plurality of UEs including UEs 402, 404, 406, 408, and 410 are shown. As shown in FIG. 4, the UEs can be vehicles (e.g., UEs 402, 404, 406, 408), roadside units (e.g., UE 410), or UEs traveling with a vehicle. As further illustrated in FIG. 4, some UEs may be traveling in the opposite direction relative to each other, e.g., UEs 402 and 406, while others may be moving in the same direction relative to each other, e.g., UEs 402 and 404 or UEs 406 and 408. In the illustrated example, UE 402 may be transmitting (e.g., broadcasting) a message 412 and may be monitoring for messages from other UEs. UE 404 may also be transmitting a message 414 and may be monitoring for messages from other UEs. Additionally, UE 406 may be transmitting a message 416 and may be monitoring for messages from other UEs. While not explicitly shown, the other UEs may also be transmitting messages and monitoring for other messages. UEs may also make determinations based on a number of factors, such as messages from other group members or QoS levels. For example, UE 402 may make a determination 422 based on a supported QoS level.

As further shown in FIG. 4, individual UEs may be a part of a group or set of UEs. For example, group 401 may include UEs 402, 404, 406, or 410. As indicated above, the group members may comprise vehicles (e.g., UEs 402, 404, 406) and/or roadside units (e.g., UE 410). Other UEs (e.g., UE 408) may be outside of the group 401. The group 401 may be an open/public group which may be open to other UEs, or a private group (e.g., a tour group, family group, public safety group, etc.) for an allowed set of UEs. One or more members of the group can also determine whether one or more additional UEs or groups of UEs are within a certain distance or area of the group 401. For instance, UE 402 can determine 422 whether additional groups are within a threshold range of the group.

The group or set of UEs 402, 404, and 406 may participate in the aforementioned QoS level monitoring or negotiation. For example, UE 402 may observe and monitor the acceptable QoS levels for UEs 404 and 406. For example, UE 402 may monitor the QoS level of UEs 404 and 406 in a timing window, the length of which may depend on the indicated QoS level supported by each UE. The timing window could be also a configuration stored on each of the UEs, or negotiated among the group members as part of the group formation signaling, e.g., signaling at application layer. In one example, a default QoS level may be 6. When UE 402 is monitoring, UEs 404 and 406 may indicate that each they can support a QoS level of 8. As such, UE 402 can monitor for a longer timing window, e.g., a window of two seconds. If UEs 404 and 406 do not lower their indicated QoS level during the window, e.g., based on the rate or condition, then UE 402 can increase the QoS level to 8. However, if one UE, e.g., UE 404, in the group is unable to support a higher QoS level of 8, and indicates it supports a QoS level of 4, then UE 402 can monitor for a shorter time period, e.g., one second. If UE 404 does not indicate that it can support a higher QoS level than 4 within the window, then the QoS level of the group may be reduced to 4. The QoS level can be used by the lower layer, e.g., the Access Stratum (AS) layer to determine the corresponding parameters, e.g., the coding, modulation parameters, or waveforms, for the transmission. For example, the AS layer can decide whether to use BPSK, or 64 QoS depending on the transmission QoS level determined for the group. Additionally, the AS layer may also decide whether or how to apply the retransmission strategy for the packets, or whether to duplicate the transmission over different carriers, e.g., when allowed by the configuration.

As mentioned herein, the present disclosure can include aspects of reflective QoS configuration for multicast. In some aspects, for an initial transmission, the AID (i.e., PSID defined by SAE or (ITS AID defined by ETSI-ITS (PSID/ITS-AID)) based mapping to a QoS profile may be used. This type of mapping can inform the UE of the starting point of the QoS level, e.g., the default QoS level. This can also apply to all groups of the same application, e.g., there may be no group identifier for the traffic. When the application layer group formation is finished, a group identifier may be generated. The group identifier may be mapped to a layer 2 (L2) identifier to be used by the AS layer, i.e., the PHY/MAC layer, as the destination identifier. Further, when the message is transmitted, it can carry the destination identifier. When the data packet is transmitted, the group identifier can be passed from the application layer to the V2X layer to be mapped to the L2 identifier.

In some aspects, a UE may start to monitor the QoS level supported for the group (i.e., the L2 identifier). The QoS level supported is determined by the received traffic of the group (i.e., L2 identifier). Accordingly, the L2 identifier can represent the group. Also, the QoS level determination can be based on the QoS level indicated in the SDAP header transmitted from the other UEs of this group. The AS layer may also perform a PHY/MAC layer observation of the traffic with the L2 identifier and indicate the supported QoS level to the V2X layer. In further aspects, the UE can adjust the QoS level indicated in the SDAP header, e.g., above the PDCP, in the outgoing traffic. The UE can also assess the QoS level for the data packet or message transmission. As mentioned above, the adjustment of the QoS level can be based on a timing window mechanism, which can be used to observe the QoS level indicated by other UEs. At any time, if the UE application layer wants to reach other UEs not yet in the current group, it can send data packets or messages without a group identifier. In some aspects, this can result in the packet or message being sent with a default QoS level based on the PSID/ITS-AID mapping as the initial message. In other aspects, this may be how the QoS level is determined in the UE starting configuration.

As mentioned herein, UEs can utilize a timing window mechanism to assess the QoS level for a transmitted data packet or message. The UE may observe the QoS level capability for all other UEs within the window. Within the timing window, each UE can send a message with a header that indicates the QoS level it can support. The radio condition may change quickly, so the timing window is used so that the QoS levels indicated do not fluctuate too much. Accordingly, the timing window helps to reduce the QoS level fluctuation. The window is used to control the QoS level used within the window period. Also, the QoS level used for data packet or message transmission may be different than the QoS level indicated in the header.

As mentioned previously, a longer timing window may be used to upgrade the QoS level compared to downgrading the QoS level. The timing window is the length of time the transmitting UE may listen or observe the other UEs to confirm or determine what QoS level can be supported. For example, the transmitting UE may observe for two seconds to upgrade the QoS level, and observe for one second to downgrade the QoS level. The timing window may also comprise time periods of other lengths. When the QoS level is upgraded, the modulation scheme used may be higher, so a longer timing window is used to be sure the UEs can support a higher QoS level. As such, the timing window is longer if the QoS level is increased because a QoS level higher than can be supported may lead to packet losses or a higher error rate, so the UEs are given a longer time period to confirm they can support the higher QoS level. As it is easier to downgrade QoS levels, the timing window may be shorter in these instances.

Because all the UEs in the set or group can transmit at the same QoS level, the QoS level may be set to the lowest QoS level supported by any UE in the group indicated in the timing window. As such, if one UE in the group supports a lower QoS level than the other UEs, the group may transmit at that lower QoS level. For example, if one UE can support a higher QoS level, e.g., QoS level 5, and three UEs indicate they can support a lower QoS level, e.g., QoS level 3, then the transmitting UE may adjust to a QoS level of 3. In some cases, a QoS level other than the lowest level may be selected. For example, a filtered or weighted QoS level may be selected based on recent or past QoS levels. While the transmitting UE is observing during the window, the UE may maintain the current QoS level. However, after the window period, the QoS level can be changed. Also, when transmitting a data packet or message, the QoS level can be indicated. After the transmission, the next time the UE has a packet or message to transmit or receive, the UE can monitor again during another timing window.

Figures 5A, 5B:
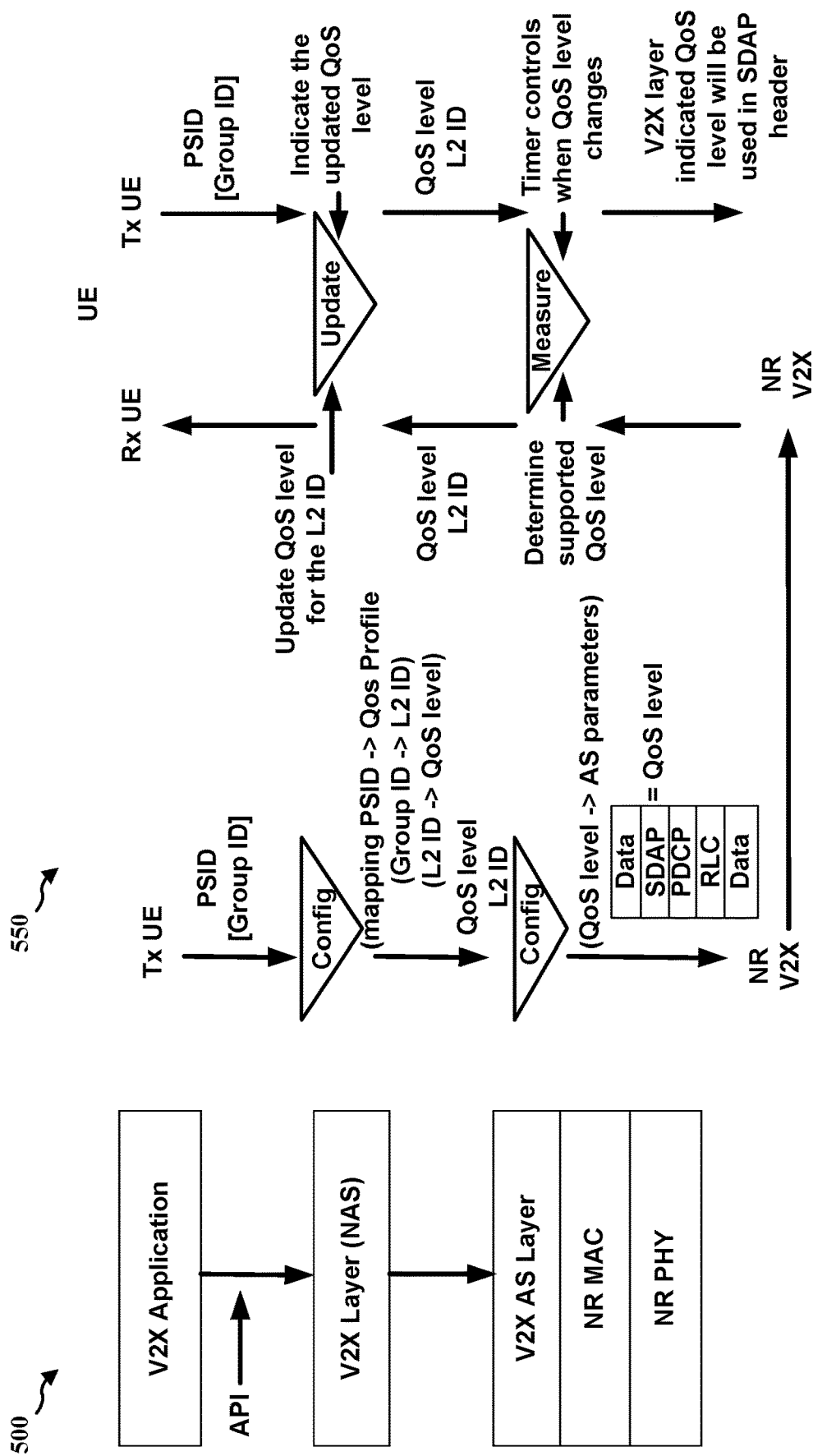
FIGS. 5A and 5B illustrate further examples of communication between UEs in a group.

FIGS. 5A and 5B illustrate an example of communication 500 and 550, respectively, between UEs in a group. More specifically, FIGS. 5A and 5B illustrate examples of reflective QoS management for multicast in eV2X according to the present disclosure. As illustrated in FIG. 5B, the transmitting UE may send the PSID and/or the group identifier, which may be sent after the initial transmission. Indeed, when the group is formed, the group identifier can be used. If the initial transmission does not include the group identifier, then the default QoS profile can be used. Over time, each UE may observe data packets or messages received from the other UEs, and it can adjust the QoS level accordingly. As illustrated in FIG. 5A, the application program interface (API) can be used for interactions between the V2X application and the V2X layer.

As shown in FIGS. 5A and 5B, from the V2X layer down, the QoS level and the L2 identifier can be indicated, in at least some aspects. The QoS level and the L2 identifier can be used by the lower layer to derive the AS layer parameters to use for transmission. In some aspects, the group identifier can be associated with the L2 identifier. The PSID may be associated with a QoS profile that can decide the initial QoS level to be used. Also, the L2 identifier may be associated with the QoS level that can be applied to the group identified by the L2 identifier. In the V2X layer, the NR MAC layer, or the NR PHY, the QoS level can be associated with the AS parameters to be used for the transmission of the messages. As further illustrated, the packet or message that is transmitted can include a data payload, an SDAP header, an RLC header, and a MAC header. Also, the SDAP header may indicate the QoS level that the transmitting UE can support for the group communication, which may be noted as an indicated QoS level.

The UE receiving the packet or message may observe the L2 identifier and determine what QoS level can be supported. In some aspects, this can be based on the channel conditions. This determined supported QoS level is passed by the AS layer to the upper layer, which may be noted as a supported QoS level. The supported QoS level may be stored and included in the SDAP header of future packets to be transmitted. As mentioned herein, the QoS level indicated in the SDAP header of the received message, i.e., the indicated QoS level, may also be retrieved to help the UE to decide the actual QoS level it can use for the group communication identified by the associated L2 identifier. The actual QoS level used may be referred to herein as a common QoS level or as a transmission QoS level. In some aspects, the common QoS level or transmission QoS level may be the QoS level transmitted by a UE, e.g., a first UE, in multicast transmission. The UE can decide the transmission QoS level based on the received indicated QoS level and/or the supported QoS level within the observing window period by, for example, taking the lowest of all the received indicated QoS levels and/or the supported QoS levels, when it is allowed to update the transmission QoS level. Accordingly, when the receiving UE has a packet or message to transmit, it can use the transmission QoS level for the AS layer, but can include the supported QoS level in the SDAP header. Further, the timing window can help the transmitting UE to determine when to change the transmission QoS level. However, the transmission QoS level used to transmit a packet or message can be decided by the transmitting UE. As such, in some aspects, the transmission QoS level used for transmitting the packet can be different from the indicated QoS level indicated in the SDAP header in the packet to be transmitted, which can be based on the supported QoS level stored at the UE and/or the received indicated QoS level.

The indicated QoS level in the SDAP header can be sent to individual UEs or sent to the group or set of UEs. Also, the QoS level may be a QoS class identifier (QCI) or a 5G QoS indicator (5QI) value. If the L2 identifier is representing a group, then the QoS level may be sent to the group. If the L2 identifier indicates another individual UE, then the QoS level may be sent to the individual UE. Therefore, the L2 identifier can represent group communication or unicast communication. In some aspects, unicast communication QoS level control can be more aggressive, e.g., by using a much shorter observing window, because a small number of UEs, e.g., two, may be considered.

In some aspects of the present disclosure, the SDAP header may be included in the multicast traffic for eV2X. In further aspects of the present disclosure, the SDAP header may be updated to indicate that it can carry the QoS level. Moreover, the AS layer and the V2X layer may interact with one another regarding the QoS level of support. Additionally, the V2X layer configuration may also be used for the QoS profile.

Figure 6:
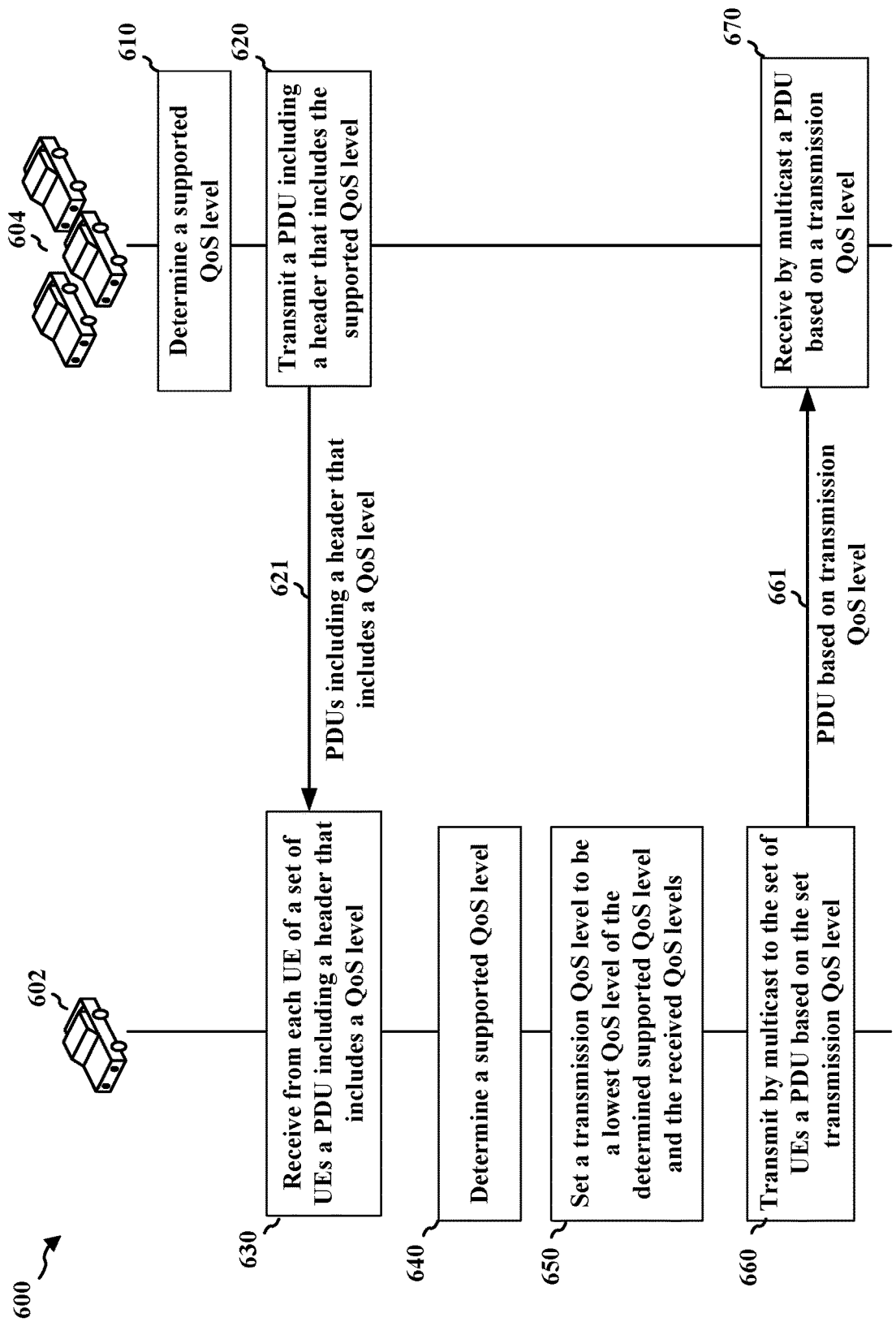
FIG. 6 is a diagram illustrating transmissions between a UE and other UEs in a group.

FIG. 6 is a diagram illustrating transmissions between a group member (e.g., UE 602) and other group members (e.g., UEs 604). For instance, at 610, each of UEs 604 can determine a supported QoS level for the UE, as described in connection with the example in FIG. 4. This QoS level may reflect the QoS level supported by each UE itself. The supported QoS level may be based on monitoring at least one of a signal to noise ratio (SNR), a signal to interference plus noise ratio (SINR), a reference signal received power (RSRP), a reference signal received quality (RSRQ), or a packet error rate. Individual UEs can determine the QoS level based on a number of factors, such as feedback from other UEs, e.g., other UEs' indicated QoS level in a header, or the UE's own PHY/MAC layer measurement. By doing so, all the UEs can be synced to the appropriate QoS level. As described in connection with the examples in in FIGS. 4, 5A, and 5B, the indicated QoS level in the SDAP header and the QoS level actually used may not be the same. At 620, each of UEs 604 may transmit a PDU 621 including a header that includes the supported QoS level for the UE, as described in connection with FIGS. 4, 5A, and 5B. At 630, UE 602 can then receive from each UE of the group of UEs 604 the PDU including a header that includes a QoS level for the UE, as further described in connection with the examples in FIGS. 4, 5A, and 5B. Additionally, as described in connection with FIGS. 5A and 5B, the header that includes a QoS level may be an SDAP header.

At 640, UE 602 can also determine a supported QoS level for the UE, which is further described in connection with the example in FIG. 4 above. As mentioned previously in connection with FIG. 4, the supported QoS level for UE 602 may be determined based on monitoring at least one of a SNR, a SINR, a RSRP, a RSRQ, or a packet error rate associated with the UE 602 for receiving each PDU from the group of UEs 604. As further described in connection with the example in FIG. 4, UE 602 may also monitor the received QoS levels from each UE of the group of UEs 604 and the determined supported QoS level for UE 602 for a first time period before setting a transmission QoS level to a QoS level lower than a current or default QoS level. The default QoS level may be based on an initial transmission. For example, the application identifier based mapping to a QoS profile may be used for an initial transmission. As described in connection with FIGS. 4, 5A, and 5B, this default QoS level can inform the UE of the starting point of the QoS level. Moreover, as described in connection with FIG. 4, UE 602 may monitor the received QoS levels from each UE of the group of UEs 604 and the determined supported QoS level for UE 602 for a second time period before setting the transmission QoS level to a QoS level higher than the current or default QoS level. The first and second time periods described above can also be referred to as a timing window. Within the window period, each group member can indicate the QoS level that they can support, which can be based on a communication packet error rate or channel condition. If any UE cannot support a certain QoS level, as indicated in the timing window, then the QoS level may be adjusted downwards to account for the lower QoS capability UE. In some aspects, as described in connection with the example in FIG. 4, the second time period may be greater than the first time period. When the QoS level is upgraded, the modulation scheme used may be higher, which is more complicated than downgrading the QoS level and using a lower modulation scheme. Hence, a longer timing window is used to give the UEs a longer time to confirm they can support the higher QoS level.

At 650, UE 602 can set the transmission QoS level for the UE 602 to be a lowest QoS level of the determined supported QoS level of the UE 602 and the received QoS levels associated with each UE of the group of UEs 604, as described in connection with FIGS. 4, 5A, and 5B. In some aspects, as described in connection with the examples in FIGS. 5A and 5B, UE 602 can determine a group identifier associated with the UE. In further aspects, the group identifier may be determined after the initial transmission. Additionally, UE 602 can determine to set a common QoS level for UEs associated with the group identifier, as described in connection with the examples in FIGS. 5A and 5B. As further described in connection with FIGS. 5A and 5B, UE 602 can identify the set of UEs to include UEs also associated with the group identifier.

At 660, UE 602 can transmit by multicast to the group of UEs 604 a PDU 661 based on the set transmission QoS level, as described in connection with FIGS. 5A and 5B. Likewise, at 670, UEs 604 can receive by multicast a PDU based on the transmission QoS level. As described in connection with FIGS. 5A and 5B, UE 602 can include the determined supported QoS level in the header of the PDU transmitted to the group of UEs 604. In some aspects, the PDU based on the transmission QoS level can include a header including an indication of the transmission QoS level. Additionally, as described in connection with FIGS. 5, 5A, and 5B, the actual QoS level used to transmit a package can be decided by the transmitting UE. As such, the transmitting UE may not use the QoS level indicated in the SDAP header. Further, as described in connection with FIGS. 5A and 5B, the transmission QoS level that is transmitted by UE 602 may be a QCI or a 5QI value.

Figure 7:
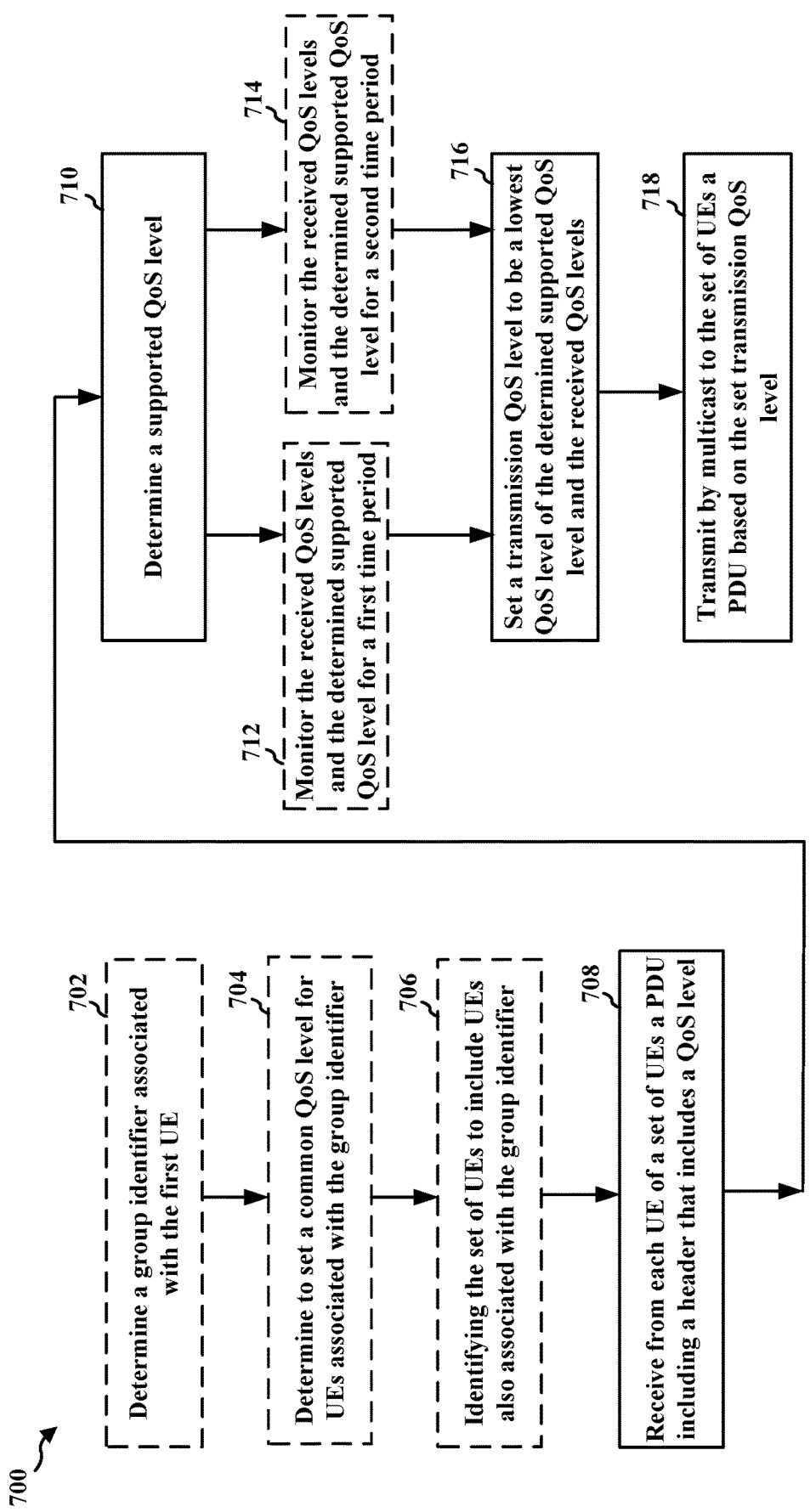
FIG. 7 is a flowchart of a method of wireless communication.

FIG. 7 is a flowchart 700 of a method of wireless communication. The method may be performed by a UE or a component of a UE (e.g., UE 104, 402, 602; device 350; apparatus 802; processing system 914, which may include the memory 360 and which may be the entire UE or a component of the UE, such as the TX processor 368, the RX processor 356, and/or the controller/processor 359) communicating with a group of UEs (e.g., UEs 104, 404, 406, 410, 604; device 310; apparatus 1102). Optional aspects are illustrated with a dashed line. As mentioned in connection with the example of FIG. 4, the UE can comprise a vehicle and/or a roadside unit and the group of UEs can comprise vehicles and/or a roadside units. As further mentioned in connection with FIG. 4, these vehicles and/or a roadside units can be part of a group. The vehicles and/or a roadside units (e.g., the UE and the group of UEs) and the group can be part of an eV2X communication network. The methods described herein can provide a number of benefits, such as improving communication signaling, resource utilization, and/or power savings.

At 702, as described in connection with the examples in FIGS. 5A and 5B, the UE can determine a group identifier associated with the UE. For example, in FIG. 6, UE 602 can determine a group identifier associated with the UE. Determination component 806 of apparatus 802 may determine a group identifier associated with the UE. As discussed supra, the UE may generate the group identifier after the application group formation is finished. Further, the group identifier can be mapped to a L2 identifier which can be used by the AS layer as a destination identifier. At 704, the UE can determine to set a common QoS level for UEs associated with the group identifier, as described in connection with FIGS. 5A and 5B. For example, in FIG. 6, UE 602 can determine to set a common QoS level for UEs associated with the group identifier. Additionally, determination component 806 of apparatus 802 may determine to set a common QoS level for UEs associated with the group identifier. For instance, the UE can determine a common QoS level, and set the common QoS level for the UEs associated with the group identifier. At 706, as further described in connection with FIGS. 5A and 5B, the UE can identify the set of UEs to include UEs also associated with the group identifier. For example, in FIG. 6, UE 602 can identify the set of UEs to include UEs also associated with the group identifier. Identification component 812 of apparatus 802 may identify the set of UEs to include UEs also associated with the group identifier. In these aspects, the UE can identify a set of UEs, and include UEs also associated with the group identifier.

At 708, the UE can receive from each UE of the group of UEs a PDU including a header that includes a QoS level for the UE, as described in connection with the examples FIGS. 4, 5A, and 5B. For example, in FIG. 6, at 630, UE 602 can receive from each UE of the group of UEs 604 the PDU including a header that includes a QoS level for the UE. Reception component 804 of apparatus 802 may receive from each UE of the group of UEs a PDU including a header that includes a QoS level for the UE. The QoS level for each UE of the group of UEs may be based on monitoring at least one of a SNR, a SINR, a RSRP, a RSRQ, or a packet error rate. Additionally, as described in connection with FIGS. 5A and 5B, the header that includes a QoS level may be an SDAP header.

At 710, the UE can determine a supported QoS level for the UE, which is described in connection with the example in FIG. 4 above. For example, in FIG. 6, at 640, UE 602 can determine a supported QoS level for the UE. Further, determination component 806 of apparatus 802 may determine a supported QoS level for the UE. The supported QoS level for the UE may be determined based on monitoring at least one of a SNR, a SINR, a RSRP, a RSRQ, or a packet error rate associated with the UE for receiving each PDU from the group of UEs.

At 712, as described in connection with the example in FIG. 4, the UE may also monitor the received QoS levels from each UE of the group of UEs and the determined supported QoS level for the UE for a first time period before setting a transmission QoS level to a QoS level lower than a current or default QoS level. For example, monitoring component 808 of apparatus 802 may monitor the received QoS levels from each UE of the group of UEs and the determined supported QoS level for the UE for a first time period before setting a transmission QoS level to a QoS level lower than a current or default QoS level. At 714, as further described in connection with FIG. 4, the UE may monitor the received QoS levels from each UE of the group of UEs and the determined supported QoS level for the UE for a second time period before setting the transmission QoS level to a QoS level higher than the current or default QoS level. For example, monitoring component 808 of apparatus 802 may monitor the received QoS levels from each UE of the group of UEs and the determined supported QoS level for the UE for a second time period before setting the transmission QoS level to a QoS level higher than the current or default QoS level. In some aspects, as described in connection with FIG. 4, the second time period may be greater than the first time period.

At 716, the UE can set the transmission QoS level for the UE to be a lowest QoS level of the determined supported QoS level of the UE and the received QoS levels associated with each UE of the group of UEs, as described in connection with FIGS. 4, 5A, and 5B. For example, in FIG. 6, at 650, UE 602 can set the transmission QoS level for UE 602 to be a lowest QoS level of the determined supported QoS level of UE 602 and the received QoS levels associated with each UE of the group of UEs 604. Setting component 810 of apparatus 802 may set the transmission QoS level for the UE to be a lowest QoS level of the determined supported QoS level of the UE and the received QoS levels associated with each UE of the group of UEs.

At 718, the UE can transmit by multicast to the group of UEs a PDU based on the set transmission QoS level, as described in connection with the examples in FIGS. 5A and 5B. For example, in FIG. 6, at 660, UE 602 can transmit by multicast to the group of UEs 604 a PDU 661 based on the set transmission QoS level. Transmission component 814 of apparatus 802 may transmit by multicast to the group of UEs a PDU based on the set transmission QoS level. As described in connection with FIGS. 5A and 5B, the UE can include the determined supported QoS level in the header of the PDU transmitted to the group of UEs. In some aspects, the PDU based on the transmission QoS level can include a header including an indication of the transmission QoS level. Moreover, as described in connection with the examples in FIGS. 5A and 5B, the set transmission QoS level that is transmitted by the UE may be a QCI or a 5QI value.

Figure 8:
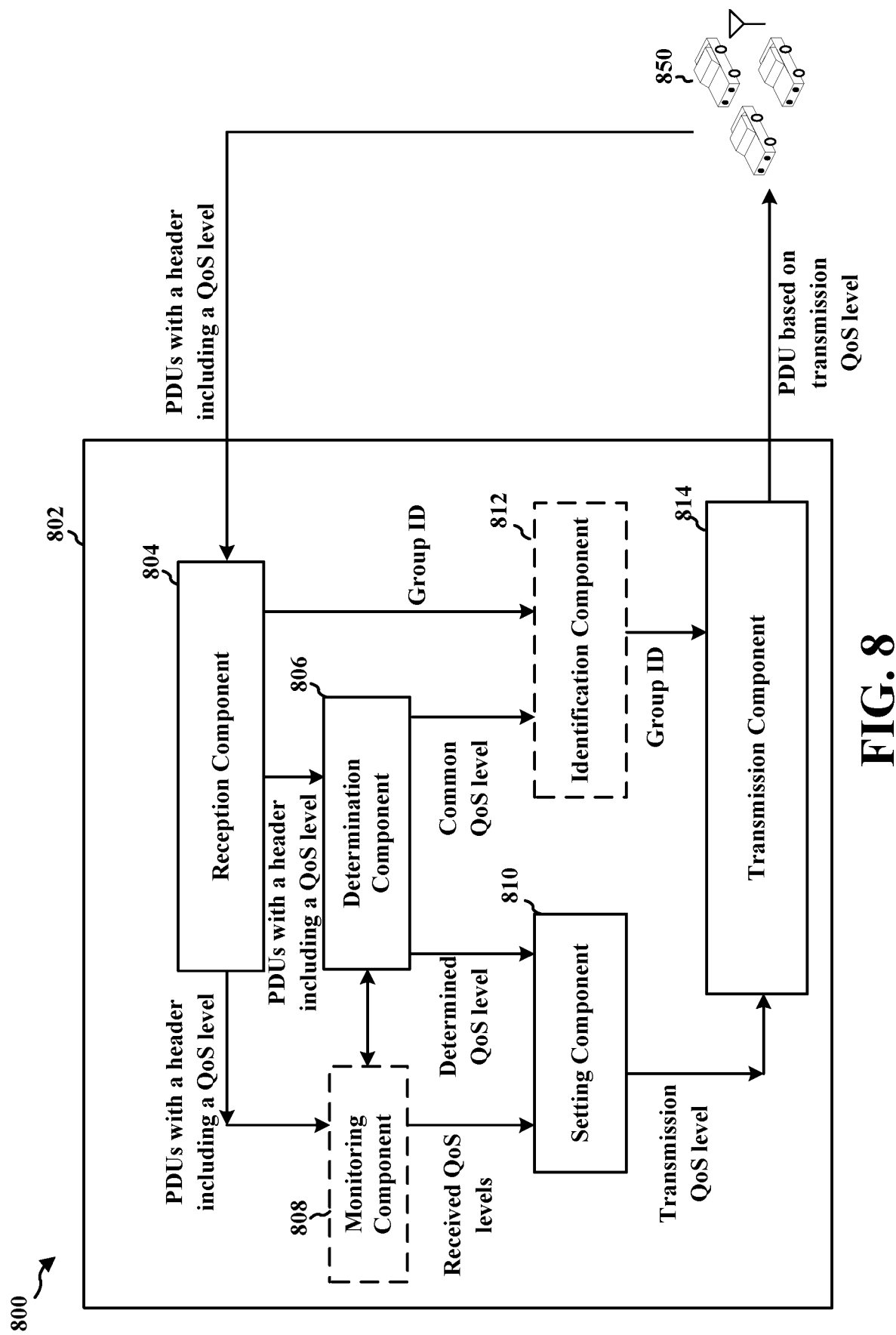
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE or a component of a UE. The apparatus can include a reception component 804 that is configured to receive from each UE of a set of UEs 850 a PDU including a header that includes a QoS level for the UE, e.g., as described in connection with step 708 above. The header may be an SDAP header. The apparatus can also include a determination component 806 that is configured to determine a supported QoS level for the UE, e.g., as described in connection with step 710 above. Also, the supported QoS level for the UE may be determined based on monitoring at least one of a SNR, a SINR, a RSRP, a RSRQ, or a packet error rate associated with the UE for receiving the PDU from the set of UEs The apparatus can also include a monitoring component 808 that is configured to monitor the received QoS levels from each UE of the set of UEs and the determined supported QoS level for the UE for a first time period before setting a transmission QoS level to a QoS level lower than a current or default QoS level, e.g., as described in connection with step 712 above. The monitoring component 808 can also be configured to monitor the received QoS levels from each UE of the set of UEs and the determined supported QoS level for the UE for a second time period before setting the transmission QoS level to a QoS level higher than the current or default QoS level, e.g., as described in connection with step 714 above. In some aspects, the second time period may be greater than the first time period.

The apparatus can include a setting component 810 that is configured to set a transmission QoS level for the UE to be a lowest QoS level of the determined supported QoS level and the received QoS levels associated with each UE of the set of UEs, e.g., as described in connection with step 716 above. The set transmission QoS level may be a QCI or 5QI value. The determination component 806 may also be configured to determine a group identifier associated with the UE, e.g., as described in connection with step 702 above. Moreover, the determination component 806 may be configured to determine to set a common QoS level for UEs associated with the group identifier, e.g., as described in connection with step 704 above. The apparatus can also include an identification component 812 that is configured to identify the set of UEs to include UEs also associated with the group identifier, e.g., as described in connection with step 706 above. Additionally, the apparatus can include a transmission component 814 that is configured to transmit by multicast to the set of UEs a PDU based on the set transmission QoS level, e.g., as described in connection with step 718 above. The UE can also include the determined supported QoS level in the header of the PDU transmitted to the set of UEs.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
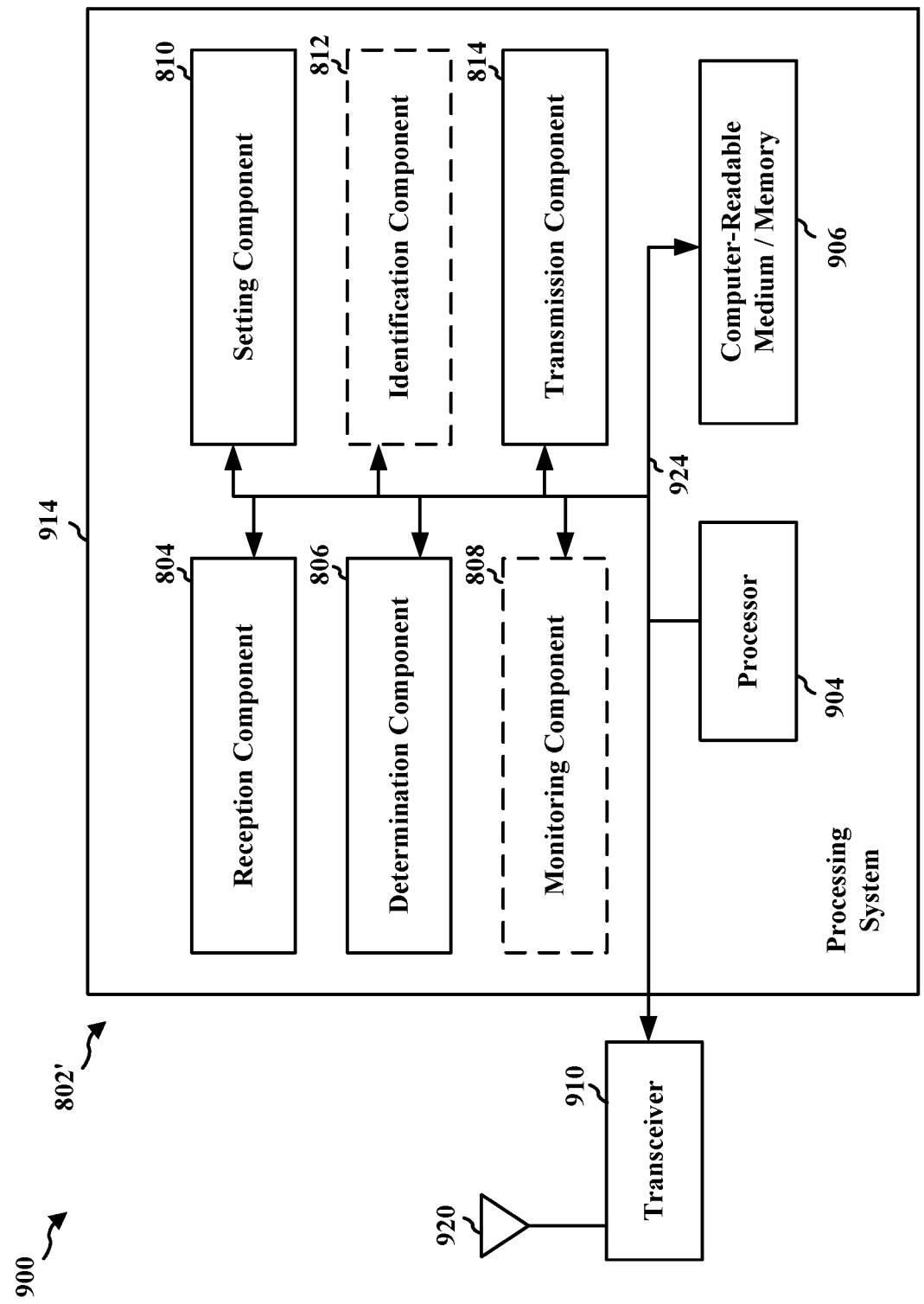
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 814, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814. The components may be software components running in the processor 904, resident/stored in the computer readable medium/memory 906, one or more hardware components coupled to the processor 904, or some combination thereof. The processing system 914 may be a component of the device 350 and may include the memory 360 and/or at least one of the TX processor 368, the RX processor 356, and the controller/processor 359.

In one configuration, the apparatus 802/802' for wireless communication includes means for receiving from each UE of a set of UEs a PDU including a header that includes a QoS level for the UE. The apparatus can also include means for determining a supported QoS level for a first UE. The apparatus can also include means for setting a transmission QoS level for the first UE to be a lowest QoS level of the determined supported QoS level and the received QoS levels associated with each UE of the set of UEs. Additionally, the apparatus can include means for transmitting by multicast to the set of UEs a PDU based on the set transmission QoS level. The means for setting the transmission QoS level for the first UE may be further configured to monitor the received QoS levels from each UE of the set of UEs and the determined supported QoS level for the first UE for a first time period before setting the transmission QoS level to a QoS level lower than a current or default QoS level. Also, the means for setting the transmission QoS level for the first UE may be further configured to monitor the received QoS levels from each UE of the set of UEs and the determined supported QoS level for the first UE for a second time period before setting the transmission QoS level to a QoS level higher than the current or default QoS level. The apparatus can also include means for determining a group identifier associated with the first UE. Further, the apparatus can include means for determining to set a common QoS level for UEs associated with the group identifier. In addition, the apparatus can include means for identifying the set of UEs to include UEs also associated with the group identifier.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
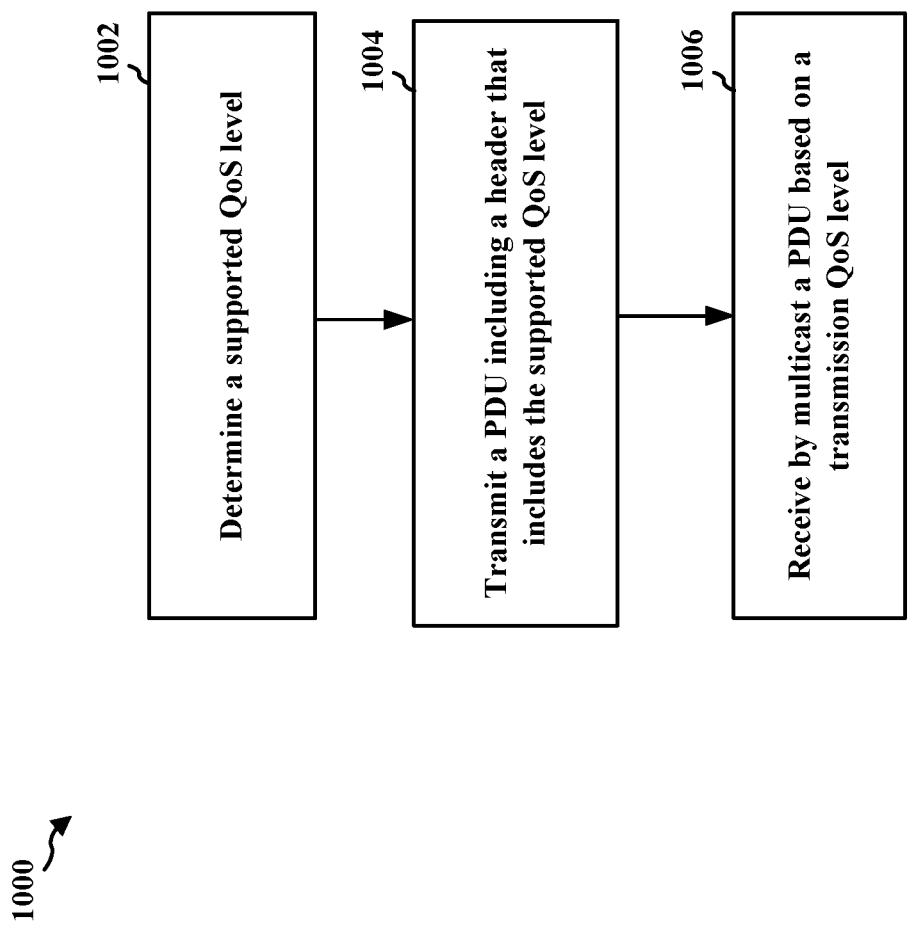
FIG. 10 is a flowchart of a method of wireless communication.

FIG. 10 is a flowchart 1000 of a method of wireless communication. The method may be performed by a group of UEs or a component of a UE in a group of UEs (e.g., UEs 104, 404, 406, 410, 604, device 310, apparatus 1102; processing system 1214, which may include the memory 360 and which may be the entire UE or a component of the UE, such as the TX processor 368, the RX processor 356, and/or the controller/processor 359) communicating with a UE (e.g., UE 104, 402, 602, device 350, apparatus 802). Optional aspects are illustrated with a dashed line. As mentioned in connection with the example of FIG. 4, the UE can comprise a vehicle and/or a roadside unit and the group of UEs can comprise vehicles and/or a roadside units. As further mentioned in connection with FIG. 4, these vehicles and/or a roadside units can be part of a group. The vehicles and/or a roadside units (e.g., the UE and the group of UEs) and the group can be part of an eV2X communication network. The methods described herein can provide a number of benefits, such as improving communication signaling, resource utilization, and/or power savings.

At 1002, each UE of the group of UEs can determine a supported QoS level for the UE, as described in connection with the example in FIG. 4. For example, determination component 1106 of apparatus 1102 may determine a supported QoS level for the UE. The supported QoS level may be based on monitoring at least one of a SNR, a SINR, a RSRP, a RSRQ, or a packet error rate. At 1004, each UE in the group of UEs may then transmit a PDU including a header that includes the supported QoS level for the UE, as described in connection with FIGS. 4, 5A, and 5B. For example, transmission component 1108 of apparatus 1102 may transmit a PDU including a header that includes the supported QoS level for the UE. Additionally, as described in connection with the examples in FIGS. 5A and 5B, the header that includes a QoS level may be an SDAP header.

At 1006, each UE of the group of UEs can receive by multicast a PDU based on a transmission QoS level. For example, reception component 1104 of apparatus 1102 may receive by multicast a PDU based on a transmission QoS level. In some aspects, the PDU based on the transmission QoS level can include a header including an indication of the transmission QoS level. As described in connection with the example in FIG. 4, the transmission QoS level can be set to a QoS level lower than a current or default QoS level if the QoS level associated with each UE of the set of UEs and the determined supported QoS level for a first UE are monitored for a first time period. Moreover, as described in connection with FIG. 4, the transmission QoS level is set to a QoS level higher than the current or default QoS level if the QoS level associated with each UE of the set of UEs and the determined supported QoS level for the first UE are monitored for a second time period. In some aspects, as described in connection with the example in FIG. 4, the second time period may be greater than the first time period. Further, the transmission QoS level can be set to be a lowest QoS level of the supported QoS level for the first UE and a QoS level associated with each UE of the group of UEs, as described in connection with FIGS. 4, 5A, and 5B.

In further aspects, as described in connection with the examples in FIGS. 5A and 5B, a group identifier can be associated with the first UE. Also, a common QoS level may be set for UEs associated with the group identifier, as described in connection with the examples in FIGS. 5A and 5B. As further described in connection with FIGS. 5A and 5B, the group of UEs can include UEs also associated with the group identifier. As described in connection with FIGS. 5A and 5B, the first UE can include the determined supported QoS level in the header of the PDU transmitted to the group of UEs. Further, as described in connection with FIGS. 5A and 5B, the transmission QoS level may be a QCI or a 5QI value.

Figure 11:
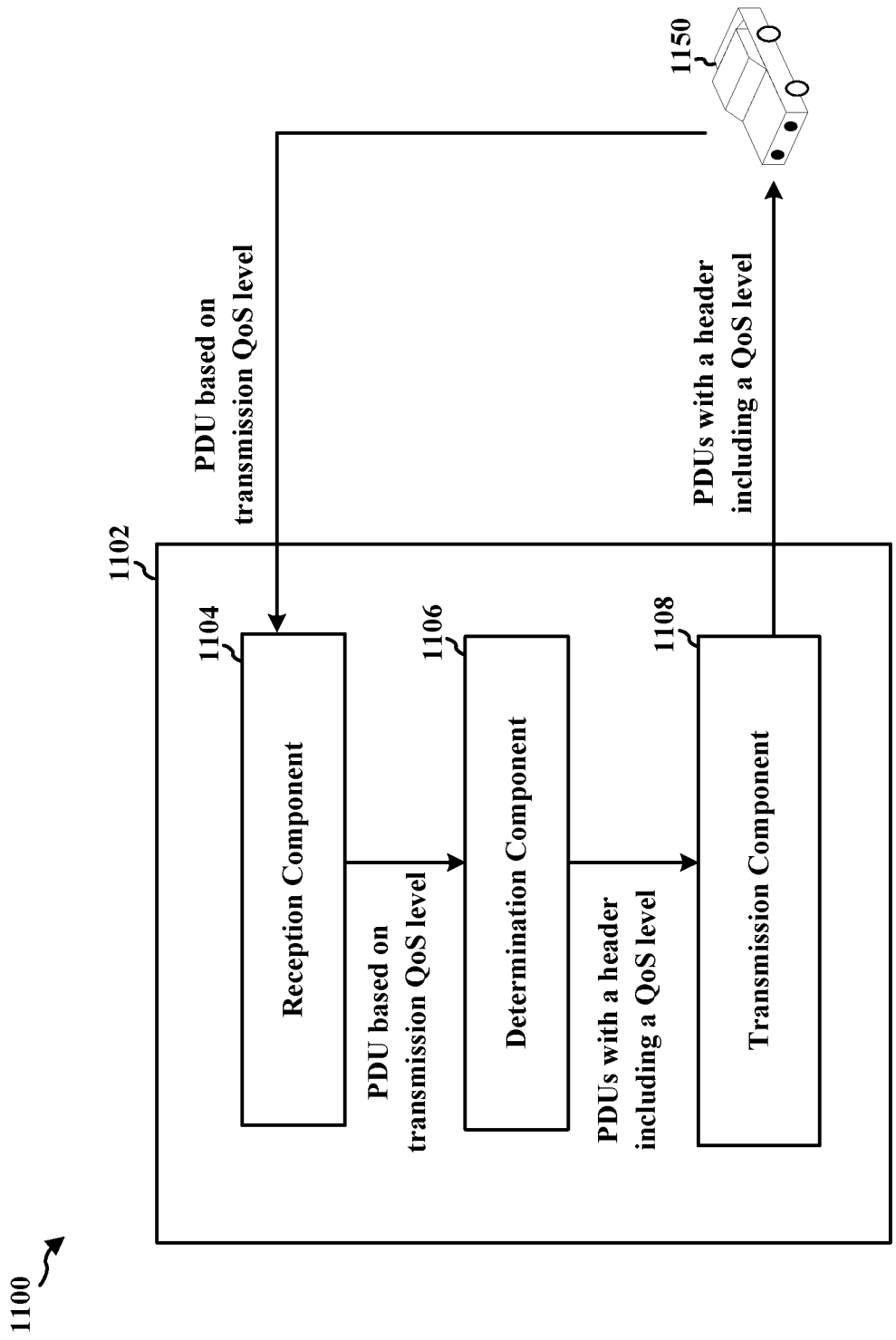
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a UE in a group of UEs or a component of a UE in a group of UEs. The apparatus can include a determination component 1106 that is configured to determine a supported QoS level for the UE, e.g., as described in connection with step 1002 above. The supported QoS level for the UE can be based on monitoring at least one of a SNR, a SINR, a RSRP, a RSRQ, or a packet error rate. The apparatus can also include a transmission component 1108 that is configured to transmit a PDU to a UE 1150 including a header that includes the supported QoS level for the UE, e.g., as described in connection with step 1004 above. Also, the UE can include the determined supported QoS level in the header of the transmitted PDU. The apparatus can also include a reception component 1104 that is configured to receive by multicast a PDU based on a transmission QoS level, e.g., as described in connection with step 1006 above. The transmission QoS level may be set to be a lowest QoS level of a supported QoS level for the UE and a QoS level associated with each UE of the group of UEs. In some aspects, the transmission QoS level may be set to a QoS level lower than a current or default QoS level if the QoS level associated with each UE of the group of UEs and the determined supported QoS level for the UE are monitored for a first time period. In other aspects, the transmission QoS level may be set to a QoS level higher than the current or default QoS level if the QoS level associated with each UE of the set of UEs and the determined supported QoS level for the UE are monitored for a second time period. The second time period can be greater than the first time period. Also, the transmission QoS level can be a QCI or 5QI value.

The apparatus may include additional components that perform each of the blocks of the algorithm in the aforementioned flowcharts of FIGS. 6 and 10. As such, each block in the aforementioned flowcharts of FIGS. 6 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
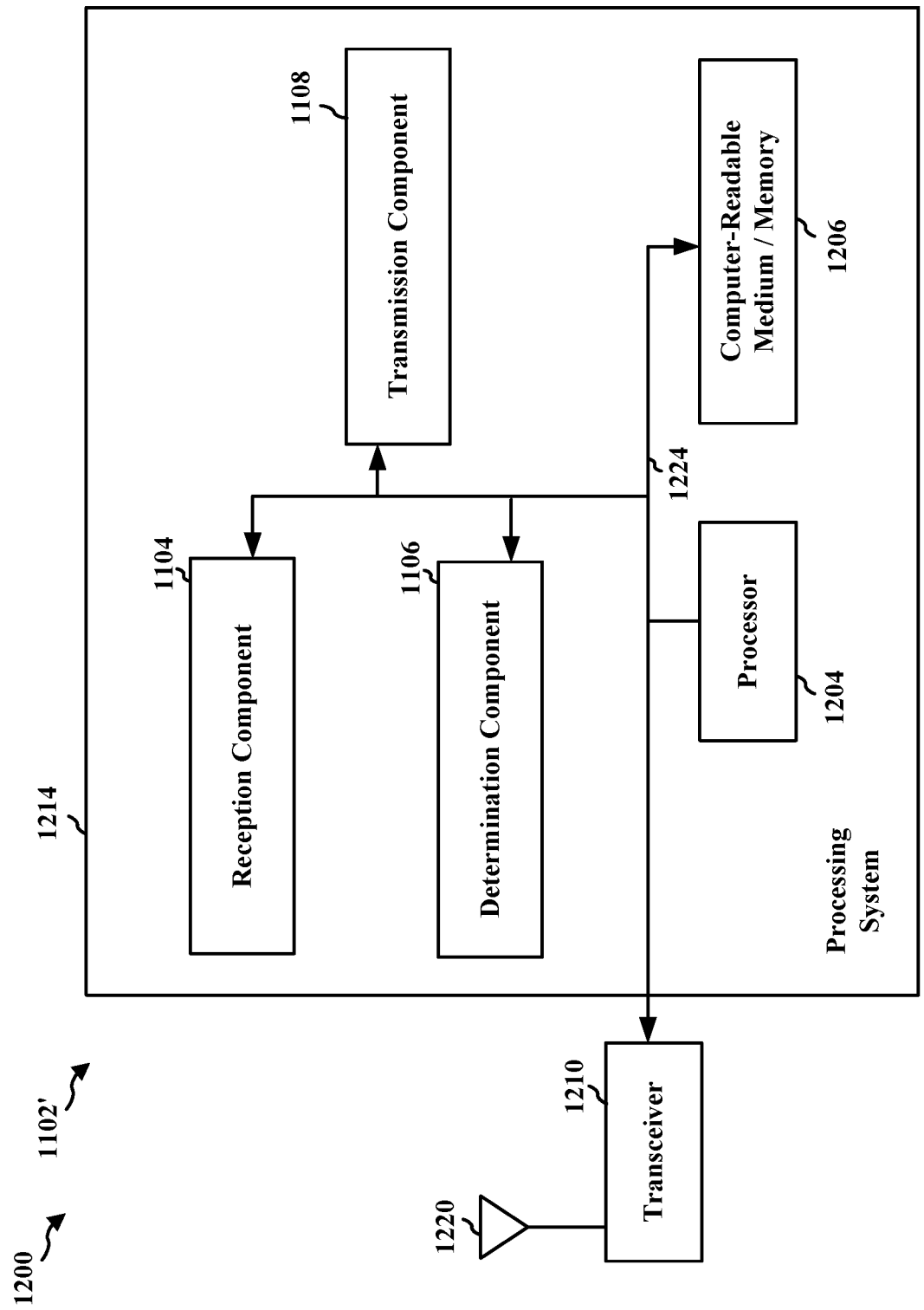
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108. The components may be software components running in the processor 1204, resident/stored in the computer readable medium/memory 1206, one or more hardware components coupled to the processor 1204, or some combination thereof. The processing system 1214 may be a component of the device 350 and may include the memory 360 and/or at least one of the TX processor 368, the RX processor 356, and the controller/processor 359.

In one configuration, the apparatus 1102/1102' for wireless communication can include means for determining a supported QoS level for a first UE of a group or set of UEs. The apparatus can also include means for transmitting a PDU including a header that includes the supported QoS level for the first UE. Additionally, the apparatus can include means for receiving by multicast a PDU based on a transmission QoS level. Further, the transmission QoS level may be set to be a lowest QoS level of the supported QoS level for the first UE and a QoS level associated with each UE of the group or set of UEs. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and aspects thereof may be combined with aspects of any embodiments and/or teachings described herein, without limitation.

Example 1 is a method of wireless communication of a first UE that includes receiving from each UE of a set of UEs a PDU including a header that includes a QoS level for the UE, determining a supported QoS level for the first UE, setting a transmission QoS level for the first UE to be a lowest QoS level of the determined supported QoS level and the received QoS levels associated with each UE of the set of UEs, and transmitting by multicast to the set of UEs a PDU based on the set transmission QoS level. In Example 2, the method of the example 1 further includes that the header is an SDAP header. In Example 3, the method of any of examples 1-2 further includes that the supported QoS level for the first UE is determined based on monitoring at least one of a SNR, a SINR, a RSRP, a RSRQ, or a packet error rate associated with the first UE for receiving the PDU from the set of UEs. In Example 4, the method of any of examples 1-3 further includes that the first UE includes the determined supported QoS level in the header of the PDU transmitted to the set of UEs. In Example 5, the method of any of examples 11-4 further includes that setting the transmission QoS level for the first UE comprises monitoring the received QoS levels from each UE of the set of UEs and the determined supported QoS level for the first UE for a first time period before setting the transmission QoS level to a QoS level lower than a current QoS level, and monitoring the received QoS levels from each UE of the set of UEs and the determined supported QoS level for the first UE for a second time period before setting the transmission QoS level to a QoS level higher than the current QoS level. In Example 6, the method of any of examples 1-5 further includes that the second time period is greater than the first time period. In Example 7, the method of any of examples 1-6 further includes determining a group identifier associated with the first UE, determining to set a common QoS level for UEs associated with the group identifier, and identifying the set of UEs to include UEs also associated with the group identifier. In Example 8, the method of any of examples 1-7 further includes that the set transmission QoS level is a QCI or 5QI value.

Example 9 is a system or apparatus including means for implementing a method or realizing an apparatus as in any of examples 1-8.

Example 10 is a device including one or more processors and memory in electronic communication with the one or more processors storing instructions executable by the one or more processors to cause the system or apparatus to implement a method as in any of examples 1-8.

Example 11 is a non-transitory computer readable medium storing instructions executable by one or more processors to cause the one or more processors to implement a method as in any of examples 1-8.

Example 12 is a method of wireless communication of a first UE of a set of UEs that includes determining a supported QoS level for a first UE, transmitting a PDU including a header that includes the supported QoS level for the first UE, receiving by multicast a PDU based on a transmission QoS level, wherein the transmission QoS level is set to be a lowest QoS level of the supported QoS level for the first UE and a QoS level associated with each UE of the set of UEs. In Example 13, the method of example 12 further includes that the header is an SDAP header. In Example 14, the method of any of examples 12-13 further includes that the supported QoS level for the first UE is based on monitoring at least one of a SNR, a SINR, a RSRP, a RSRQ, or a packet error rate. In Example 15, the method of any of examples 12-14 further includes that the first UE includes the determined supported QoS level in the header of the transmitted PDU. In Example 16, the method of any of examples 12-15 further includes that a group identifier is associated with the first UE, wherein a common QoS level is set for UEs associated with the group identifier, and wherein the set of UEs includes UEs also associated with the group identifier. Example 17, the method of any of examples 12-16 further includes that the transmission QoS level is a QCI or 5QI value. In Example 18, the method of any of examples 12-17 further includes that the PDU based on the transmission QoS level includes a header including an indication of the transmission QoS level.

Example 19 is a system or apparatus including means for implementing a method or realizing an apparatus as in any of examples 12-18.

Example 20 is a device including one or more processors and memory in electronic communication with the one or more processors storing instructions executable by the one or more processors to cause the system or apparatus to implement a method as in any of examples 12-18.

Example 21 is a non-transitory computer readable medium storing instructions executable by one or more processors to cause the one or more processors to implement a method as in any of examples 12-18.

It is understood that the specific order or hierarchy of blocks in the processes/ flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first user equipment (UE), comprising:
    receiving from each UE of a set of UEs a packet data unit (PDU) including a header that includes a quality of service (QoS) level for the UE;
    determining a supported QoS level for the first UE;
    setting a transmission QoS level for the first UE to be a lowest QoS level of the determined supported QoS level for the first UE and the QoS level from each UE of the set of UEs, wherein setting the transmission QoS level for the first UE comprises:
        monitoring the QoS level from each UE of the set of UEs and the determined supported QoS level for the first UE for a first time period before setting the transmission QoS level to a QoS level lower than a current QoS level; or
        monitoring the QoS level from each UE of the set of UEs and the determined supported QoS level for the first UE for a second time period before setting the transmission QoS level to a QoS level higher than the current QoS level; and
    transmitting by multicast to the set of UEs a PDU transmission based on the set transmission QoS level.

2. The method of claim 1, wherein the header is a service data adaptation protocol (SDAP) header.

3. The method of claim 1, wherein the supported QoS level for the first UE is determined based on monitoring at least one of a signal to noise ratio (SNR), a signal to interference plus noise ratio (SINR), a reference signal received power (RSRP), a reference signal received quality (RSRQ), or a packet error rate associated with the first UE for receiving the PDU from the set of UEs.

4. The method of claim 1, wherein the first UE includes the determined supported QoS level in a header transmission of the PDU transmission to the set of UEs.

5. The method of claim 1, wherein the second time period is greater than the first time period.

6. The method of claim 1, further comprising:
    determining a group identifier associated with the first UE;
    determining to set a common QoS level for UEs associated with the group identifier; and
    identifying the set of UEs to include UEs also associated with the group identifier.

7. The method of claim 1, wherein the set transmission QoS level is a QoS class identifier (QCI) or 5G QoS indicator (5QI) value.

8. An apparatus for wireless communication at a first user equipment (UE), comprising:
    a memory; and
    at least one processor coupled to the memory and configured to:
        receive from each UE of a set of UEs a packet data unit (PDU) including a header that includes a quality of service (QoS) level for the UE;
        determine a supported QoS level for the first UE;
        set a transmission QoS level for the first UE to be a lowest QoS level of the determined supported QoS level for the first UE and the QoS level from each UE of the set of UEs, wherein setting the transmission QoS level for the first UE includes the at least one processor further configured to:
            monitor the QoS level from each UE of the set of UEs and the determined supported QoS level for the first UE for a first time period before setting the transmission QoS level to a QoS level lower than a current QoS level; or
            monitor the QoS level from each UE of the set of UEs and the determined supported QoS level for the first UE for a second time period before setting the transmission QoS level to a QoS level higher than the current QoS level; and
        transmit by multicast to the set of UEs a PDU transmission based on the set transmission QoS level.

9. The apparatus of claim 8, wherein the header is a service data adaptation protocol (SDAP) header.

10. The apparatus of claim 8, wherein the supported QoS level for the first UE is determined based on monitoring at least one of a signal to noise ratio (SNR), a signal to interference plus noise ratio (SINR), a reference signal received power (RSRP), a reference signal received quality (RSRQ), or a packet error rate associated with the first UE for receiving the PDU from the set of UEs.

11. The apparatus of claim 8, wherein the first UE includes the determined supported QoS level in a header transmission of the PDU transmission to the set of UEs.

12. The apparatus of claim 8, wherein the second time period is greater than the first time period.

13. The apparatus of claim 8, wherein the at least one processor is further configured to:
    determine a group identifier associated with the first UE;
    determine to set a common QoS level for UEs associated with the group identifier; and
    identify the set of UEs to include UEs also associated with the group identifier.

14. The apparatus of claim 8, wherein the set transmission QoS level is a QoS class identifier (QCI) or 5G QoS indicator (5QI) value.

15. A method of wireless communication of a first user equipment (UE) of a set of UEs, comprising:
    determining a supported quality of service (QoS) level for the first UE;
    transmitting a packet data unit (PDU) transmission including a header that includes the supported QoS level for the first UE; and
    receiving by multicast a received PDU based on a transmission QoS level, wherein the transmission QoS level is based on a first time period if the transmission QoS level is lower than a previous QoS level or is based on a second time period if the transmission QoS level is higher than the previous QoS level;
    wherein the transmission QoS level in the received PDU is based on the supported QoS level for the first UE in the PDU transmission and a supported QoS level for a transmitting UE.

16. The method of claim 15, wherein the header is a service data adaptation protocol (SDAP) header.

17. The method of claim 15, wherein the supported QoS level for the first UE is based on monitoring at least one of a signal to noise ratio (SNR), a signal to interference plus noise ratio (SINR), a reference signal received power (RSRP), a reference signal received quality (RSRQ), or a packet error rate.

18. The method of claim 15, wherein the first UE includes the determined supported QoS level in the header of the PDU transmission.

19. The method of claim 15, wherein a group identifier is associated with the first UE;
wherein a common QoS level is set for UEs associated with the group identifier; and
wherein the set of UEs includes UEs also associated with the group identifier.

20. The method of claim 15, wherein the transmission QoS level is a QoS class identifier (QCI) or 5G QoS indicator (5QI) value.

21. The method of claim 15, wherein the received PDU based on the transmission QoS level includes a received header including an indication of the transmission QoS level.

22. An apparatus for wireless communication at a first user equipment (UE) of a set of UEs, comprising:
a memory; and
at least one processor coupled to the memory and configured to:
determine a supported quality of service (QoS) level for the first UE;
transmit a packet data unit (PDU) transmission including a header that includes the supported QoS level for the first UE; and
receive by multicast a received PDU based on a transmission QoS level, wherein the transmission QoS level is based on a first time period if the transmission QoS level is lower than a previous QoS level or is based on a second time period if the transmission QoS level is higher than the previous QoS level;
wherein the transmission QoS level in the received PDU is based on the supported QoS level for the first UE in the PDU transmission and a supported QoS level for a transmitting UE.

23. The apparatus of claim 22, wherein the header is a service data adaptation protocol (SDAP) header.

24. The apparatus of claim 22, wherein the supported QoS level for the first UE is based on monitoring at least one of a signal to noise ratio (SNR), a signal to interference plus noise ratio (SINR), a reference signal received power (RSRP), a reference signal received quality (RSRQ), or a packet error rate.

25. The apparatus of claim 22, wherein the first UE includes the determined supported QoS level in the header of the PDU transmission.

26. The apparatus of claim 22, wherein a group identifier is associated with the first UE;
wherein a common QoS level is set for UEs associated with the group identifier; and
wherein the set of UEs includes UEs also associated with the group identifier.

27. The apparatus of claim 22, wherein the transmission QoS level is a QoS class identifier (QCI) or 5G QoS indicator (5QI) value.

28. The apparatus of claim 22, wherein the received PDU based on the transmission QoS level includes a received header including an indication of the transmission QoS level.

* * * * *